United States Patent
Goebel et al.

(10) Patent No.: US 6,921,516 B2
(45) Date of Patent: Jul. 26, 2005

(54) REACTOR SYSTEM INCLUDING AUTO IGNITION AND CARBON SUPPRESSION FOAM

(75) Inventors: Steven G. Goebel, Victor, NY (US); Gerald E. Voecks, Fairport, NY (US); Robert N. Carter, Honeoye Falls, NY (US)

(73) Assignee: General Motors Corporation, Detroit, MI (US)

(*) Notice: Subject to any disclaimer, the term of this patent is extended or adjusted under 35 U.S.C. 154(b) by 499 days.

(21) Appl. No.: 09/976,925

(22) Filed: Oct. 15, 2001

(65) Prior Publication Data

US 2003/0072700 A1 Apr. 17, 2003

(51) Int. Cl.[7] .............................. B01J 8/02; C10J 3/20
(52) U.S. Cl. .......................... 422/191; 422/211; 48/63; 48/127.9; 48/192
(58) Field of Search .......................... 48/62 R, 63, 89, 48/118.5, 127.9, 192, 198.2, 198.7, 212, 215, 214 A; 422/171, 176, 177, 180, 191, 193, 195, 211, 222, 236

(56) References Cited

U.S. PATENT DOCUMENTS

| | | | | |
|---|---|---|---|---|
| 4,027,476 A | * | 6/1977 | Schmidt | 60/218 |
| 4,049,395 A | * | 9/1977 | Ito | 48/197 R |
| 5,112,578 A | * | 5/1992 | Murayama et al. | 422/197 |
| 5,155,994 A | * | 10/1992 | Muraki et al. | 60/275 |
| 5,611,198 A | * | 3/1997 | Lane et al. | 60/299 |
| 5,878,567 A | * | 3/1999 | Adamczyk et al. | 60/274 |
| 5,914,015 A | * | 6/1999 | Barlow et al. | 204/177 |
| 6,232,005 B1 | * | 5/2001 | Pettit | 429/19 |
| 6,245,309 B1 | * | 6/2001 | Etievant et al. | 423/248 |
| 6,596,424 B2 | * | 7/2003 | Goebel | 429/17 |
| 2002/0108308 A1 | * | 8/2002 | Grieve | |

OTHER PUBLICATIONS

U.S. Appl. No. 09/820,600 filed Mar. 30, 2001, "Apparatus for Mixing Fuel and an Oxidant".

* cited by examiner

Primary Examiner—Kevin P. Kerns
(74) Attorney, Agent, or Firm—Cary W. Brooks

(57) ABSTRACT

A reactor system including a reactor housing having an inlet portion defined at one end of the housing and having a discharge opening formed in the housing at an opposite end. An air intake charge line is connected to the housing for charging air into the inlet portion. A steam charge line is connected to the housing for charging steam into the inlet portion. A fuel injector is positioned in the housing for injecting fuel into the stream of air and steam flowing through the housing. A fuel charge line is connected to the fuel injector for charging a carbon-based fuel into the injector. A catalyst bed is carried in the housing and positioned downstream of the fuel injector and at least a portion of the catalyst bed includes a catalyst for promoting the reformation of the carbon-based fuel to produce hydrogen. An auto-ignition suppression and carbon-suppression foam is carried in the housing and positioned between the catalyst bed and the fuel injector.

28 Claims, 2 Drawing Sheets

REACTOR SYSTEM INCLUDING AUTO IGNITION AND CARBON SUPPRESSION FOAM

TECHNICAL FIELD

This invention relates to a reactor system for producing hydrogen for use in a fuel cell, and more particularly to a reactor system including an auto ignition and carbon suppression foam.

BACKGROUND OF THE INVENTION

A fuel cell is an electrochemical device for continuously converting chemicals—a fuel and an oxidant—into direct-current electricity. It consists of two electronic-conductor electrodes separated by an ion-conducting electrolyte with provision for the continuous movement of fuel, oxidant and reaction product into and out of the cell. Fuel cells differ from batteries in that electricity is produced from chemical fuels fed to them as needed, so that their operating life is theoretically unlimited. Fuel is oxidized at the anode (negative electrode), giving electrons to an external circuit. Simultaneously with the electron transfer, an ionic current in the electrolyte completes the circuit. The fuels range from hydrogen and carbonaceous materials to redox compounds, alkali metals and biochemical materials. Fuel cells based on hydrogen and oxygen have a significant future as a primary energy source. Cells of this type are under development for use as a power source for electric automobiles, the hydrogen being derived from methanol, gasoline, diesel fuel or the like.

Fuel cells such as PEM fuel cells have been proposed for many applications including electrical power plants to replace internal combustion engines. PEM fuel cells are well known in the art and include a "membrane electrode assembly" (a.k.a. MEA) comprising a thin, proton transmissive, solid polymer membrane-electrolyte having an anode on one of its faces and a cathode on the opposite face. The solid polymer electrolytes are typically made from ion exchange resins such as perfluoronated sulfonic acid. The anode/cathode typically comprises finely divided catalytic particles (often supported on carbon particles) admixed with proton-conductive resin. The MEA is sandwiched between a pair of electrically-conductive elements which (1) serve as current collectors for the anode and cathode, and (2) contain channels for distributing the fuel cell's gaseous reactants over the surfaces of the respective anode and cathode. In PEM fuel cells, hydrogen is the anode reactant (i.e., fuel) and oxygen is the cathode reactant (i.e., oxidant).

For vehicular applications, it is desirable to use a carbon-bound hydrogenous fuel (e.g., methane, gasoline, methanol, etc.). Such liquid fuels are particularly desirable as the source of the hydrogen used by the fuel cell owing to their ease of on-board storage and the existence of a nationwide infrastructure of service stations that can conveniently supply such liquids. These fuels must be dissociated to release their hydrogen content for fueling the fuel cell. The dissociation reaction is accomplished in a so-called "primary reactor" which is the first in a series of reactors comprising the fuel processor. Other reactors in the fuel processor serve to remove CO from the hydrogen produced by the primary reactor. One such known primary reactor for gasoline, for example, is a two-stage chemical reactor often referred to as an "autothermal reformer." In an autothermal reformer (ATR), gasoline and water vapor (i.e., steam) are mixed with air and pass sequentially through two reaction sections, i.e., a first "partial oxidation" (POX) section and a second steam reforming (SR) section. In the POX section and with an open flame or a catalyst, the gasoline reacts exothermically with a substoichiometric amount of air to produce carbon monoxide, hydrogen and lower hydrocarbons such as methane. The hot POX reaction products, along with the steam introduced with the gasoline, pass into a SR section where the lower hydrocarbons and a fraction of the carbon monoxide react with the steam to produce a reformate gas comprising principally hydrogen, carbon dioxide and carbon monoxide. The SR reaction is endothermic, but obtains its required heat either from the heat that is generated in the exothermic POX section and carried forward into the SR section by the POX section effluent, or from other parts of the fuel cell system (e.g., from a combustor). One such autothermal reformer is described in International Patent Publication Number WO 98/08771, published Mar. 5, 1998.

Downstream of the ATR, the carbon monoxide contained in the SR effluent is removed, or at least reduced to very low concentrations (i.e., less than about 20 ppm) that are non-toxic to the anode catalyst in the fuel cell. To this end, fuel processors are known that cleanse the SR effluent of CO by first subjecting it to a so-called "water-gas-shift" reaction (i.e., $CO+H_2O \rightarrow CO_2+H_2$) followed by reacting it with oxygen (i.e., as air) in a so-called "preferential oxidation reaction" (i.e., $CO+1/2O_2 \rightarrow CO_2$). The CO-cleansed, $H_2$-rich reformate is then supplied to the fuel cell.

Again, for an auto-thermal reformer, the air, fuel and steam must be mixed before entering the primary reactor. For system efficiency, it is desirable to integrate heat into these streams. However, at high temperatures (about 500° C. to 600° C.), the auto-ignition delay times of hydrocarbon fuels are relatively short (10 to 100 ms). If auto-ignition does occur before the mixture enters the primary reactor catalyst, these gas phase reactions will tend to form undesirable carbon deposits. The high temperatures can also cause pyrolysis of the fuel, leading to carbon formation. By utilizing a distributed injection device, the time required for mixing can be reduced, and the required mixing scale is small (based on the distance between the distributed injection points). Distributed injection can also be achieved by spray injection of liquid fuels as the fuel droplets can be dispersed over the cross-section of the inlet by the distribution and penetration of the fuel droplets. However, for an auto-thermal reformer requiring a large turndown, further enhancements may be required to achieve auto-ignition and carbon-free operation.

The present invention satisfies a need existing in the prior art and provides alternatives to and advantages over the prior art.

SUMMARY OF THE INVENTION

A reactor system for producing hydrogen to be used by a fuel cell stack. A reactor housing is provided having an inlet portion defined at one end of the housing and including a discharge opening formed in the housing at an opposite end. An air intake charge line is connected to the housing for charging air into the inlet portion. A steam charge line is connected to the housing to charge steam into the inlet portion. Alternatively, both the air and the steam may be charged into the inlet portion through a single line. The housing is constructed and arranged so that the air and steam flow through the housing from the inlet portion through the discharge opening formed in the housing at the opposite end. A fuel injector is positioned in the housing for injecting fuel into the stream of air and steam flowing through the housing.

A fuel charge line is connected to the fuel injector for charging a carbon-based fuel into the fuel injector. A catalyst bed is carried in the housing and positioned downstream of the fuel injector. At least a portion of the catalyst bed includes a catalyst for promoting the reformation of the carbon-based fuel to produce hydrogen. An auto-ignition and carbon-suppression foam is carried in the housing and positioned between the catalyst bed and the fuel injector.

The auto-ignition and carbon-suppression foam includes a porous material having a plurality of pores formed therein with an average pore size ranging from about 10 to 40 pores per inch, 10 to 20 pores per inch, 20 to 30 pores per inch, or 30 to 40 pores per inch. Preferably, the auto-ignition and carbon-suppression foam has a void fraction ranging from about 80% to 90%.

The pore spacing in the auto-ignition and carbon-suppression foam is at least one-tenth of the injector spacing, and preferably the pore spacing ranges from about one-tenth to one-half of the injector spacing.

The auto-ignition and carbon-suppression foam is preferably made from any of a variety of ceramic materials including zirconia and/or alumina. A catalyst agent may be deposited on the foam to suppress the auto-ignition of the fuel. The agent may include lead and/or gold and may be, for example, lead oxide and/or lead molybdate.

Preferably, the fuel injector is positioned in the housing to allow mixing of the fuel, air and steam without reacting before contacting the catalyst bed. The catalyst bed includes a first portion having a catalyst thereon to promote the partial oxidation of the carbon-based fuel. A second portion of the catalyst bed includes a catalyst thereon for promoting the reformation of the carbon-based fuel. Preferably, the first portion of the catalyst bed is positioned upstream of the second portion.

The auto-ignition and carbon-suppression foam may include a first face closest to the fuel injector and a rear face closest to the catalyst bed. The first face of the foam preferably has a cross-sectional area less than the rear face.

In one embodiment, the fuel injector includes at least one tube traversing the cross section of the inlet portion. The tube includes a plurality of holes formed therein for distributing fuel into the housing. In another embodiment of the invention, the fuel injector includes a body portion having an orifice formed therein and constructed and arranged to atomize the fuel exiting the injector orifice.

The catalyst bed may be a ceramic monolith having through holes formed therein. Also, the catalyst bed may be a plurality of individual support structures each supporting a catalyst. Alternatively, the catalyst bed may be a plurality of catalyst pellets or beads. In another embodiment, the catalyst bed may be a plurality of substrates having a catalyst thereon. The substrates may either be flat or alternatively configured.

In another embodiment of the invention the fuel injector includes a main body portion having an orifice defined therein and constructed and arranged to atomize the fuel flowing out of the fuel injector and into the flow path of the air and steam flowing through the housing. The auto-ignition and carbon-suppression foam includes a front face closest to the fuel injector and a rear face closest to the catalyst bed, and wherein the fuel injector is spaced a distance from front face of the auto-ignition and carbon-suppression foam to define an injector distance. The injector distance is sufficient so that the fuel flowing out of the injector covers substantially all of the front face of the auto-ignition and carbon-suppression foam These and other objects, features and advantages of the present invention will become apparent from the following brief description of the drawings, detailed description of the preferred embodiments, and appended claims and drawings.

DESCRIPTION OF THE PREFERRED EMBODIMENT

Figure 1:
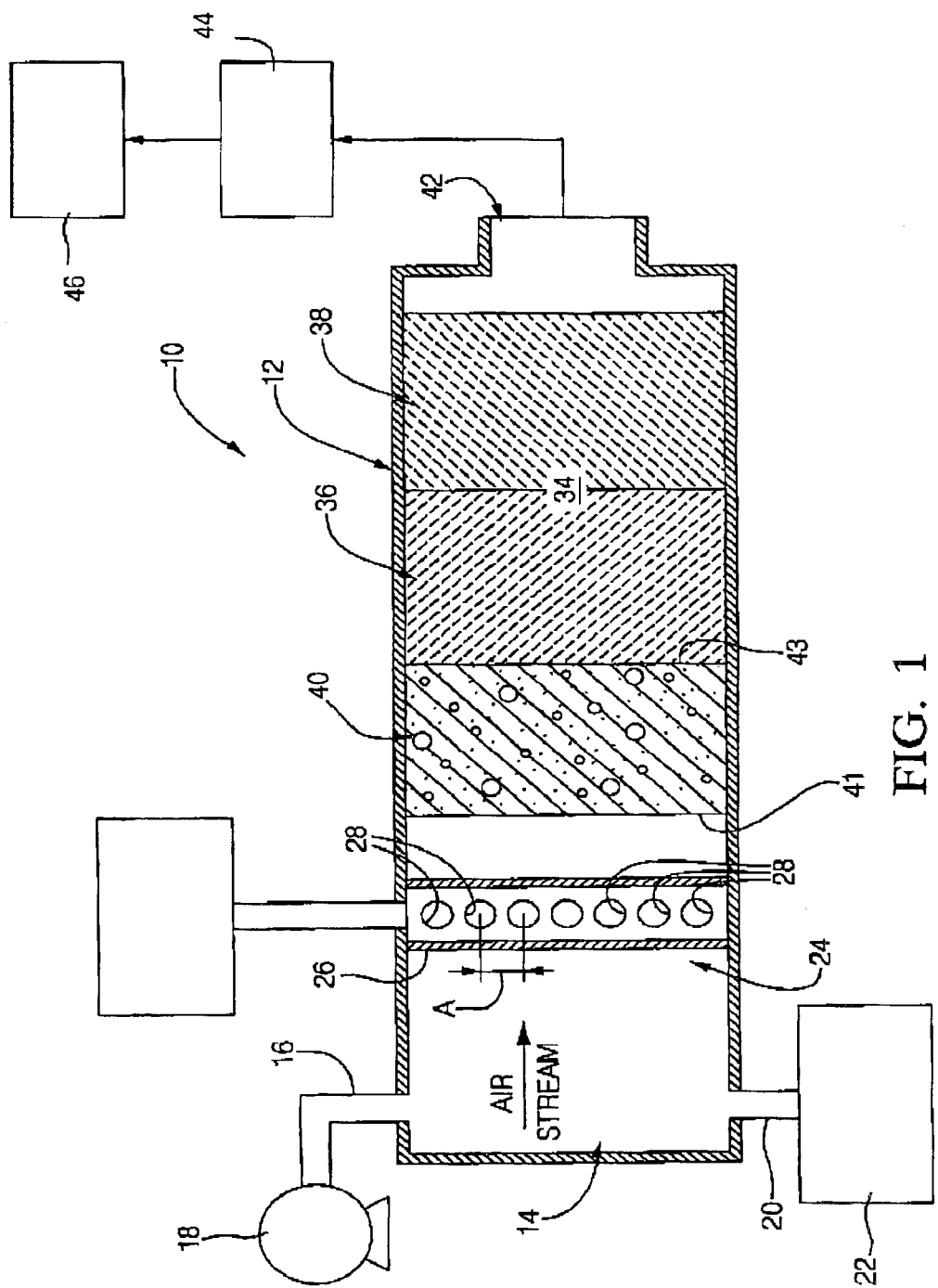
FIG. 1 is a schematic illustration of one embodiment of a reactor system according to the present invention.

FIG. 1 illustrates a fuel cell system including a reactor system according to the present invention. The embodiment of FIG. 1 is particularly suited for use with gaseous or vaporized fuel. A reactor 10 is provided and includes a housing 12 which typically would be generally tubular in shape and includes an inlet portion 14. The inlet portion 14 is generally an open chamber into which air is charged via an air line 16 which typically is connected to a compressor or pump 18. Likewise, steam is charged into the inlet portion using the steam charge line 20 that is connected to a steam generator or boiler 22. A fuel injector 24 is provided downstream of the inlet portion 14 and is constructed and arranged to charge a carbon-based fuel into the flow path of the air in stream travelling through the reactor 10. The fuel injector 24 shown in FIG. 1 includes at least one tube 26 traversing the inlet cross section and includes a plurality of holes 28 formed therein for injecting fuel into the flow path of the air and steam travelling through the reactor 10. The tube 26 may be located relatively close to the front face 41 of an auto-ignition and carbon-suppression foam 40. The holes 28 are positioned a distance, identified by item A (FIG. 1), from each other. The distance as identified by A in FIG. 1 will hereafter be referred to as the injector spacing.

The holes 28 formed in the tube 26 of the fuel injector 24 are closely spaced, typically from about 0.25 to 1.0 inch apart from each other. The auto ignition and carbon suppression foam preferably is constructed from a ceramic material having high temperature stability. Such materials are commercially available and are typically made from zirconia or alumina and preferably have pore sizes ranging from about 10–40 pores per inch, 20–30 pores per inch, or 30–40 pores per inch. Preferably, the foam has a void fraction ranging from about 80% to 90%. The pores in the foam material are basically spherical in shape, have a generally uniform size and spacing, and are interconnected. Preferably, the longitudinal thickness of the foam should be at least four times the injector spacing. Preferably, the pore spacing should be at least about one-tenth to about one-half times the injector spacing. For example, with a one-half inch injector spacing, the foam should be at least two inches thick with a maximum of 20 pores per inch.

The surface of the porous foam suppresses reactions by thermal quenching of the energetic species when the gas is flowing through the reactor and by the presence of inert third bodies for radical quenching. The foam may be coated with catalytic agents to further suppress auto-ignition and carbon formation. The catalytic agents may be selected to bond to radical species to suppress chain reactions leading to auto-ignition and to suppress hydrogen extraction which would lead to fuel paralysis and carbon deposits. The catalytic agents may include lead and gold. For example, lead-based catalytic agents may be in the form of lead oxide or lead molybdate for stability and bonding to the foam material.

Downstream from the auto-ignition and carbon-suppression foam 40, and preferably immediately downstream, is a catalytic bed 34 including a first section 36 having a catalyst thereon such as platinum (Pt) to promote the partial oxidation of the organic-based fuel. The partial oxidation reaction is exothermic and supplies sufficient heat to drive a reforming reaction carried on in the second section 38 of the catalyst bed. The second section 38 of the catalyst bed includes a catalyst such as rhodium (Rh) or nickel (Ni) for promoting the reformation of the carbon-based fuel to produce hydrogen. The catalyst bed 38 may be a ceramic monolith having through holes formed therethrough for passage of the air, steam and fuel and reaction products. Alternatively, the catalyst bed may be either pellets or beads, or a plurality of substrates, being flat or alternatively configured, and having the catalyst for promoting the reformation reaction thereon. The housing 12 includes an outlet opening 42 formed therein from which reaction products of the partial oxidation reaction and the reformation reaction leave the reactor 10. Preferably, additional downstream reactors and reaction stream purification equipment are provided. Typical downstream reactors may include high temperature and low temperature water gas shift reactors and preferential oxidation reactors. These downstream reactors and purification equipment components are generally indicated by the block 44 in FIG. 1. These downstream reactors and purification components preferably reduce the amount of carbon monoxide in the fuel stream to less than 50 ppm. Thereafter, the hydrogen-rich stream is delivered to a fuel cell stack 46 where it is combined with another oxidant such as oxygen in the form of air to produce electricity.

Figure 2:
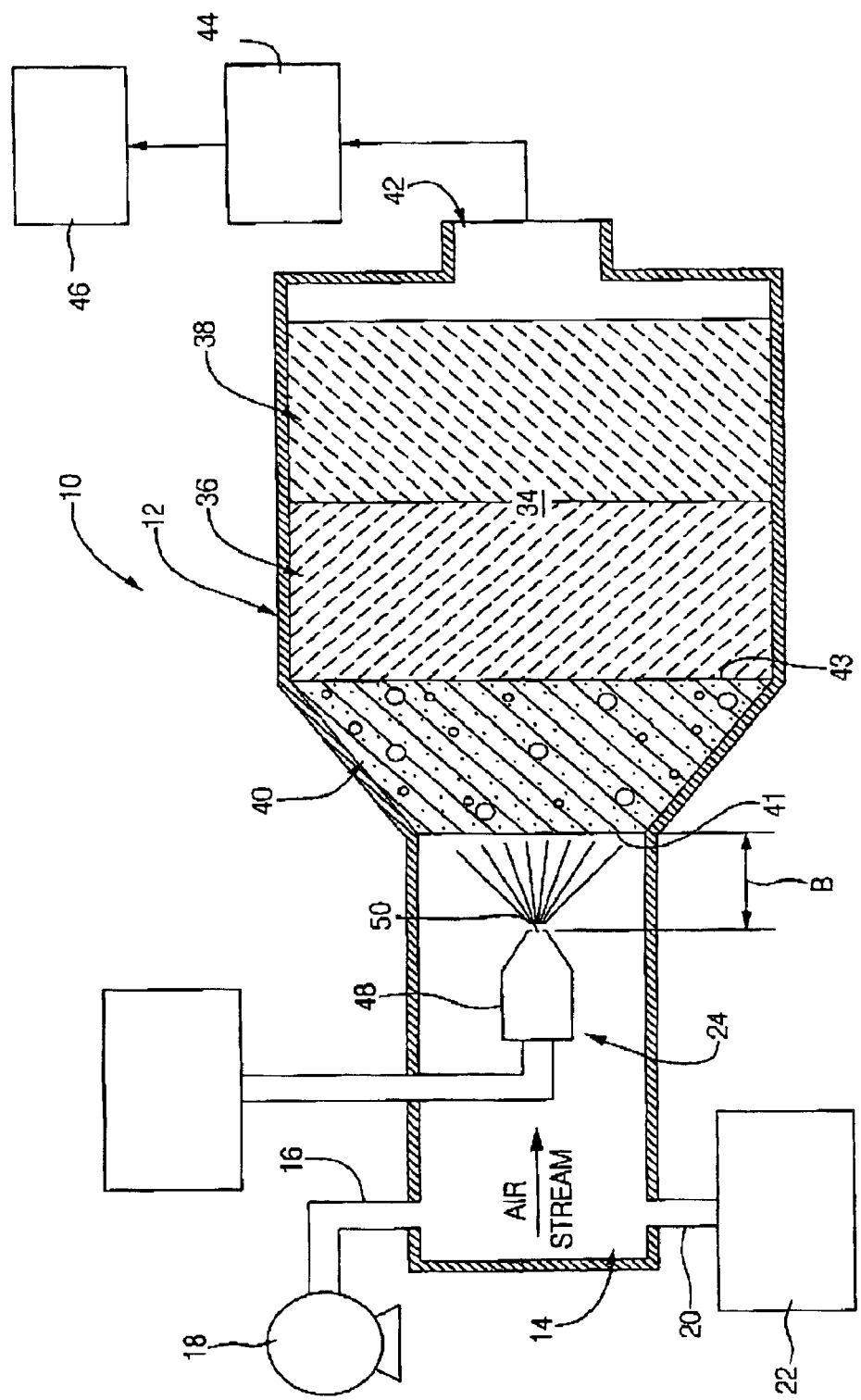
FIG. 2 is an alternative embodiment of a reactor system according to the present invention.

FIG. 2 illustrates an alternative embodiment of the present invention with a few minor modifications to the system illustrated in FIG. 1. The embodiment of FIG. 2 is particularly suited for use with a liquid fuel. The fuel injector 24 includes a main body portion 48 having an orifice 50 defined therein and constructed and arranged to atomize the carbon-based fuel flowing out of the injector and into the flow path of the air and steam flowing through the reactor 10. Likewise, this fuel injector 24 is positioned a distance, as identified by item B in FIG. 2, from the front face 41 of the auto-ignition and carbon-suppression foam 40 to define the injector distance. The injector distance B is required to allow the fuel spray to cover the front face 41 of the auto-ignition and carbon-suppression foam 40 based on the spray angle. The auto-ignition and carbon-suppression foam 40 allows time for the fuel to vaporize and mix as the fuel travels through the foam without reacting before the catalyst bed 34. In either arrangement (FIG. 1 or FIG. 2), the auto-ignition and carbon-suppression foam 40 may be constructed to accommodate different cross-sectional areas in the housing between generally the inlet portion 14 and the portion of the housing carrying the catalyst bed 34. Preferably, the auto-ignition and carbon-suppression foam 40 includes a rear face 43 that has a cross-sectional area substantially matching that of the catalyst bed 34.

In an auto-thermal reformer, the air, fuel and steam streams must be thoroughly mixed before the mixture enters the partial oxidation reaction section of the reactor. However, at high temperatures typical of auto-thermal reformers in the range of about 500° C. to 600° C., auto-ignition delay times for carbon-based fuel such as methanol, gasoline, etc., are relatively short (10 to 100 ms). If auto-ignition occurs before a mixture enters the partial oxidation reactor section, the gas phase reactions will tend to form undesirable carbon deposits (i.e., soot) which foul the partial oxidation reactor. This is also particularly troublesome in catalytic partial oxidation reactors as the soot contaminates the catalyst, which reduces its effectiveness and increases the pressure drop throughout the reactor. The present invention, which utilizes an auto-ignition and carbon-suppression foam, allows for sufficient resonance time to mix the air, fuel and steam but without resulting in auto-ignition and carbon deposits.

What is claimed is:

1. A reactor system comprising:
    a reactor housing including an inlet portion defined therein at one end of the housing and having a discharge opening formed in the housing at an opposite end;
    an air charge line connected to the housing for charging air into the inlet portion;
    a steam charge line connected to the housing for charging steam into the inlet portion, and wherein the housing is constructed and arranged so that a stream of the air and steam flow through the housing from the inlet portion through the discharge opening formed at the opposite end of the housing;
    a fuel injector positioned in the housing for injecting fuel into the stream of air and steam flowing through the housing;
    a fuel charge line connected to the fuel injector for charging a carbon-based fuel into the fuel injector;
    a catalyst bed carried in the housing and positioned downstream of the fuel injector, and wherein at least a portion of the catalyst bed includes a catalyst for promoting the reformation of the carbon-based fuel to produce hydrogen;
    a foam carried in the housing and positioned between the catalyst bed and the fuel injector, the foam being constructed and arranged to suppress auto ignition and suppress carbon formation, and a catalyst agent coated on the foam, the catalyst agent comprising at least one of lead, lead oxide, lead molybdate and gold.

2. A reactor system as set forth in claim 1 wherein the foam comprises a porous material having a plurality of pores formed therein with an average pore size ranging from about 10 to 40 pores per inch.

3. A reactor system as set forth in claim 2 wherein the average pore size ranges from about 10 to 20 pores per inch.

4. A reactor system as set forth in claim 2 wherein the average pore size ranges from about 20 to 30 pores per inch.

5. A reactor system as set forth in claim 2 wherein the average pore size ranges from about 30 to 40 pores per inch.

6. A reactor system as set forth in claim 1 wherein the foam has a void fraction ranging from about 80% to 90%.

7. A reactor system as set forth in claim 1 wherein the injector includes multiple spaced-apart holes for injecting fuel and wherein the spacing between the holes defines the injector spacing.

8. A reactor system as set forth in claim 7 wherein the pore spacing in the foam is at least one-tenth of the injector spacing.

9. A reactor system as set forth in claim 7 wherein the pore spacing in the foam ranges from about one-tenth to one-half of the injector spacing.

10. A reactor system as set forth in claim 1 wherein the foam comprises zirconia.

11. A reactor system as set forth in claim 1 wherein the foam comprises alumina.

12. A reactor system as set forth in claim 1 wherein the fuel injector is positioned in the housing to allow mixing of the fuel, air and steam without reacting before contacting the catalyst bed.

13. A reactor system as set forth in claim 1 wherein the catalyst bed includes a first portion having a catalyst to promote the partial oxidation of the carbon-based fuel, and further including a second portion having a catalyst to promote the reformation of the carbon-based fuel to form hydrogen.

14. A reactor system as set forth in claim 13 wherein the first portion of the catalyst bed is positioned upstream of the second portion.

15. A reactor system as set forth in claim 1 wherein the foam includes a front face closest to the fuel injector and a rear face closest to the catalyst bed, and wherein the front face has a cross-sectional area less than the rear face.

16. A reactor system as set forth in claim 1 wherein the fuel injector comprises at least one tube traversing the cross section of the inlet portion of the housing and having a plurality of holes formed in the tube for distributing fuel therethrough.

17. A reactor system as set forth in claim 1 wherein the fuel injector comprises an injector body having an injection orifice formed therein and constructed and arranged to atomize the fuel exiting the injector orifice.

18. A reactor system as set forth in claim 1 wherein the catalyst bed comprises a ceramic monolith having through holes formed therein.

19. A reactor system as set forth in claim 1 wherein the catalyst bed comprises a plurality of individual support structures each having a catalyst coated thereon.

20. A reactor system as set forth in claim 1 wherein the catalyst bed comprises a plurality of catalyst pellets.

21. A reactor system as set forth in claim 1 wherein the catalyst bed comprises a plurality of substrates each having a catalyst coated thereon.

22. A reactor system as set forth in claim 21 wherein the substrates are substantially flat.

23. A reactor system as set forth in claim 1 wherein the fuel injector comprises a main body portion having an orifice defined therein and constructed and arranged to atomize the fuel flowing out of the fuel injector and into the flow path of the air and steam flowing through the housing, and wherein the foam includes a front face closest to the fuel injector and a rear face closest to time catalyst bed, and wherein the fuel injector is spaced a distance from the front face of the foam to define an injector distance, and wherein the injector distance is sufficient so that the fuel flowing out of the injector covers substantially all of the front face of the foam.

24. A reactor system as set forth in claim 1 wherein the foam comprises a ceramic material.

25. A system comprising:
   a reactor housing having an inlet portion defined therein and having a discharge opening;
   a charge line connected to the housing for charging air into the inlet portion;
   a steam charge line connected to the housing for charging steam into the inlet portion, and wherein the housing is constructed and arranged so that a stream of the air and steam flow through the housing from the inlet portion through the discharge opening;
   a fuel injector positioned in the housing for injecting fuel into the stream of air and steam flowing through the housing;
   a fuel charge line connected to the fuel injector for charging a carbon-based fuel into the fuel injector;
   a catalyst bed carried in the housing and positioned downstream of the fuel injector, and wherein at least a portion of the catalyst bed includes a catalyst for promoting a reformation of the carbon-based fuel to produce hydrogen;
   a foam carried in the housing and positioned between the catalyst bed and the fuel injector, the foam being constructed and arranged to suppress auto ignition and suppress carbon formation.

26. A system as set forth in claim 25 further comprising a catalyst agent coated on the foam, the catalyst agent comprising at least one of lead, lead oxide, lead molybdate and gold.

27. A system as set forth in claim 25 wherein the foam further comprises a ceramic material.

28. A system as setforth in claim 25 further comprising a fuel cell downstream of the reactor housing and connected to the reactor housing to receive hydrogen produced from the reformation of the carbon-based fuel.

* * * * *